United States Patent [19]

Chujo

[11] Patent Number: 5,671,017
[45] Date of Patent: Sep. 23, 1997

[54] DISPLAY UNIT INCLUDING CIRCUIT FOR CONTROLLING CONNECTION TO A POWER SOURCE BASED ON PRESENCE OR ABSENCE OF A SYNC SIGNAL

[75] Inventor: Takeshi Chujo, Nagasaki, Japan

[73] Assignee: Mitsubishi Denki Kabushiki Kaisha, Tokyo, Japan

[21] Appl. No.: 523,525

[22] Filed: Sep. 1, 1995

[30] Foreign Application Priority Data

Mar. 3, 1995  [JP]  Japan ................................. 7-043975

[51] Int. Cl.$^6$ ........................................................... H04N 5/63
[52] U.S. Cl. ........................................... 348/378; 348/730
[58] Field of Search ................................... 348/173, 177, 348/378, 380, 730, 377; H04N 5/63

[56] References Cited

U.S. PATENT DOCUMENTS

| | | | |
|---|---|---|---|
| 4,749,919 | 6/1988 | Beaumont et al. | 348/378 |
| 5,089,754 | 2/1992 | George | 348/173 |
| 5,331,354 | 7/1994 | Koyama | 348/730 |
| 5,389,952 | 2/1995 | Kikinis | 348/730 |
| 5,491,794 | 2/1996 | Wu | 348/730 |
| 5,555,032 | 9/1996 | Kung | 348/730 |

FOREIGN PATENT DOCUMENTS 3-214871  9/1991  Japan.

*Primary Examiner*—Victor R. Kostak
*Attorney, Agent, or Firm*—Burns, Doane, Swecker & Mathis, LLP

[57] ABSTRACT

A display unit comprises a video amplifying circuit for amplifying a video signal and outputting the amplified video signal to a cathode-ray tube, a sync separation circuit, a deflection circuit, a high-voltage circuit, a synchronizing signal control circuit for judging whether a synchronizing signal outputted from the sync separation circuit is present and outputting a signal indicative of the presence or absence of the synchronizing signal therefrom and having a synchronizing signal control switch for permitting the supply of an output indicative of the absence of the synchronizing signal at all times as needed, a power source control circuit for opening and closing a power source circuit in response to the output of the synchronizing signal control circuit and a power switch electrically connected to a power terminal. The sync separation circuit, the synchronizing signal control circuit and the power source control circuit are directly supplied with source power from a power source through the power switch and the other circuits are supplied with source power from the power source circuit.

4 Claims, 4 Drawing Sheets

DISPLAY UNIT INCLUDING CIRCUIT FOR CONTROLLING CONNECTION TO A POWER SOURCE BASED ON PRESENCE OR ABSENCE OF A SYNC SIGNAL

BACKGROUND OF THE INVENTION

1. Field of the Invention

The present invention relates to a display unit using a cathode-ray tube (hereinafter called "CRT") for displaying a video signal thereon as a picture.

2. Description of the Prior Art

FIG. 4 is a block diagram showing one example of a display unit using a conventional CRT, which has been disclosed in Japanese Patent Publication No. Hei 3-214871, for example. In the drawing, reference numeral 1 indicates a video amplifying circuit for amplifying a video signal SI and outputting the amplified video signal to a CRT 5. Reference numeral 2 indicates a sync separation circuit for separating a synchronizing signal from the video signal SI to take out it. Reference numeral 3 indicates a deflection circuit for allowing a sawtooth current synchronized with the synchronizing signal outputted from the sync separation circuit 2 to flow in a deflection coil 4 of the CRT 5. Reference numeral 7 indicates a high voltage circuit for receiving an output supplied from the deflection circuit 3 therein and supplying a high voltage to the CRT 5. Reference numeral 6 indicates a power source circuit for supplying a power source voltage to the video amplifying circuit 1, the sync separation circuit 2, the deflection circuit 3 and the high voltage circuit 7, which are principal circuits. Reference numeral 8 indicates a power switch for switching an input power input VI. Reference numeral 27 indicates a sync detecting circuit for detecting the synchronizing signal in the video signal SI. Reference numeral 10 indicates a power source control circuit for opening and closing the power source circuit 6 in response to the synchronizing signal detected by the sync detecting circuit 27.

The operation of the display unit will now be described. When the video signal SI is input to the display unit, the sync detecting circuit 27 detects the synchronizing signal in the video signal SI. Thus, the power source control circuit 10 is activated in response to the detected synchronizing signal so that the power input VI is applied to the power source circuit 6, whereby the video amplifying circuit 1, the sync separation circuit 2, the deflection circuit 3 and the high voltage circuit 7 are activated under the supply of a power source voltage from the power source circuit 6. On the other hand, when the video signal SI is not inputted to the display unit, the sync detecting circuit 27 does not detect the synchronizing signal. Therefore, no power input VI is applied to the power source circuit 6 so that the circuits other than the sync detecting circuit 27 are deactivated.

This type of conventional display unit has problems that since the sync detecting circuit 27 detects the synchronizing signal in the video signal SI and the power source control circuit 10 is turned on and off based on the detected synchronizing signal, the display unit becomes complex in circuit configuration and the power source remains turned on until the supply of the synchronizing signal is stopped, and when the synchronizing signal is erroneously reset, the power source circuit 6 is automatically activated and maintained as it is.

It goes without saying that the conventional display unit can completely stop operating when the power switch is turned off. Since, however, the time required to re-start the display unit when required is long in this case, there has been a demand for maintaining the power switch in an on state if possible.

SUMMARY OF THE INVENTION

With the foregoing in view, it is therefore an object of the present invention to provide a display unit which is capable of directly turning off a power source by a user's will, preventing the power source from remaining turned on upon non-utilization of the display unit, conserving power, preventing the danger incident to the operation of a high voltage circuit, providing longer life of the display unit, preventing a power source circuit from malfunctioning due to the automatic reset of a synchronizing signal and providing a quick response upon re-starting the display unit and which is particularly effective on a system using a vast number of CRT displays.

It is another object of the present invention to provide a display unit capable of simultaneously controlling the supply of a plurality of positive and negative power sources to a load circuit and providing a saving in all power employed in the display unit.

It is a further object of the present invention to provide a display unit capable of being reduced in cost and providing a quick response.

It is a still further object of the present invention to provide a display unit simple in circuit configuration.

According to a first aspect of the invention, for achieving the above objects, there is provided a display unit comprising: a video amplifying circuit for amplifying a video signal and outputting the amplified video signal to a cathode-ray tube; a sync separation circuit for separating a synchronizing signal from the video signal to take out the synchronizing signal; a deflection circuit for allowing a sawtooth current synchronized with an output produced from the sync separation circuit to flow into a deflection coil of the cathode-ray tube; a high voltage circuit for receiving therein an output produced from the deflection circuit and supplying a high voltage to the cathode-ray tube; a synchronizing signal control circuit for determining whether the synchronizing signal obtained from the sync separation circuit is present and outputting a signal indicative of the presence or absence of the synchronizing signal therefrom, the synchronizing signal control circuit having a synchronizing signal control switch for enabling the supply of a signal indicative of the absence of the synchronizing signal at all times as necessary; a power source control circuit for opening and closing a power source circuit for supplying power to some circuit components in the respective circuits, in response to an output supplied from the synchronizing signal control circuit; and a power switch connected to a terminal for inputting the power to the display unit; whereby the sync separation circuit, the synchronizing signal control circuit and the power source control circuit are directly supplied with power from a power source through the power switch and other circuits are supplied with power from the power source circuit.

In the display unit according to the first aspect of the invention, as described above, when the synchronizing signal control switch is deactivated (turned off), the power source control circuit is controlled based on the drive signal indicative of the "presence" or "absence" of the synchronizing signal produced from the synchronizing signal control circuit. On the other hand, when the synchronizing signal control switch is actuated (turned on), the synchronizing signal control circuit supplies the drive signal indicative of the "absence" of the synchronizing signal to the power source control circuit regardless of the presence or absence of the synchronizing signal. Therefore, no power input is supplied to the power source circuit, thus resulting in the deactivation of the circuits other than the synchronizing signal control circuit and the sync separation circuit. Accordingly, the synchronizing signal control switch can be actuated so as to prevent the power source from malfunctioning. AS a result, the display unit is capable of preventing the power source from remaining turned on when the display unit is not in use, conserving power, preventing the danger incident to the operation of the high voltage circuit, providing longer life of the display unit, preventing the power source circuit from malfunctioning due to the automatic reset of the synchronizing signal and providing a quick response upon re-starting the display unit. Further, the display unit is particularly effective on a system using a vast number of CRT displays.

According to a second aspect of the invention, there is provided a display unit wherein the power source circuit comprises a positive power source for supplying a positive voltage to a load circuit, a negative power source for supplying a negative voltage, a first control device for controlling the supply of power from the positive power source, and a second control device for controlling the supply of power from the negative power source and the power source control circuit has control means for simultaneously controlling the first and second control devices in response to a drive signal outputted from the synchronizing signal control circuit.

In the display unit according to the second aspect of the invention, as described above, a saving in all power used up by the display unit can be realized by causing the control means to simultaneously control the first and second control devices.

According to a third aspect of the invention, there is provided a display unit wherein a device for controlling a second control device of the control means is a phototransistor controlled on the drive signal outputted from the synchronizing signal control circuit.

Since the display unit according to the third aspect of the invention makes use of the phototransistor as described above, the display unit becomes inexpensive and provides a quick response.

According to a fourth aspect of the invention, there is provided a display unit wherein the synchronizing signal control circuit comprises a two-input selector and a drive circuit for driving the power source control circuit, and a select port, one input, the other input and the output of the two-input selector are respectively coupled to the synchronizing signal control switch, a constant voltage level, the synchronizing signal and the drive circuit.

In the display unit according to the fourth aspect of the present invention, as described above, the synchronizing signal control switch capable of directly conveying a user's will is provided as an external switch and is constructed in combination with the two-input selector. It is therefore possible to simplify a circuit configuration and improve a response speed.

BRIEF DESCRIPTION OF THE DRAWINGS

The above and other objects and novel features of the present invention will become more fully apparent from the following detailed description, taken in conjunction with the accompanying drawings. However, the accompanying drawings are offered by way of illustration alone and are not intended to limit the scope of the invention.

DETAILED DESCRIPTION OF THE PREFERRED EMBODIMENTS

Preferred embodiments of the present invention will hereinafter be described in detail with reference to the accompanying drawings.

[Embodiment 1]

Figure 1:
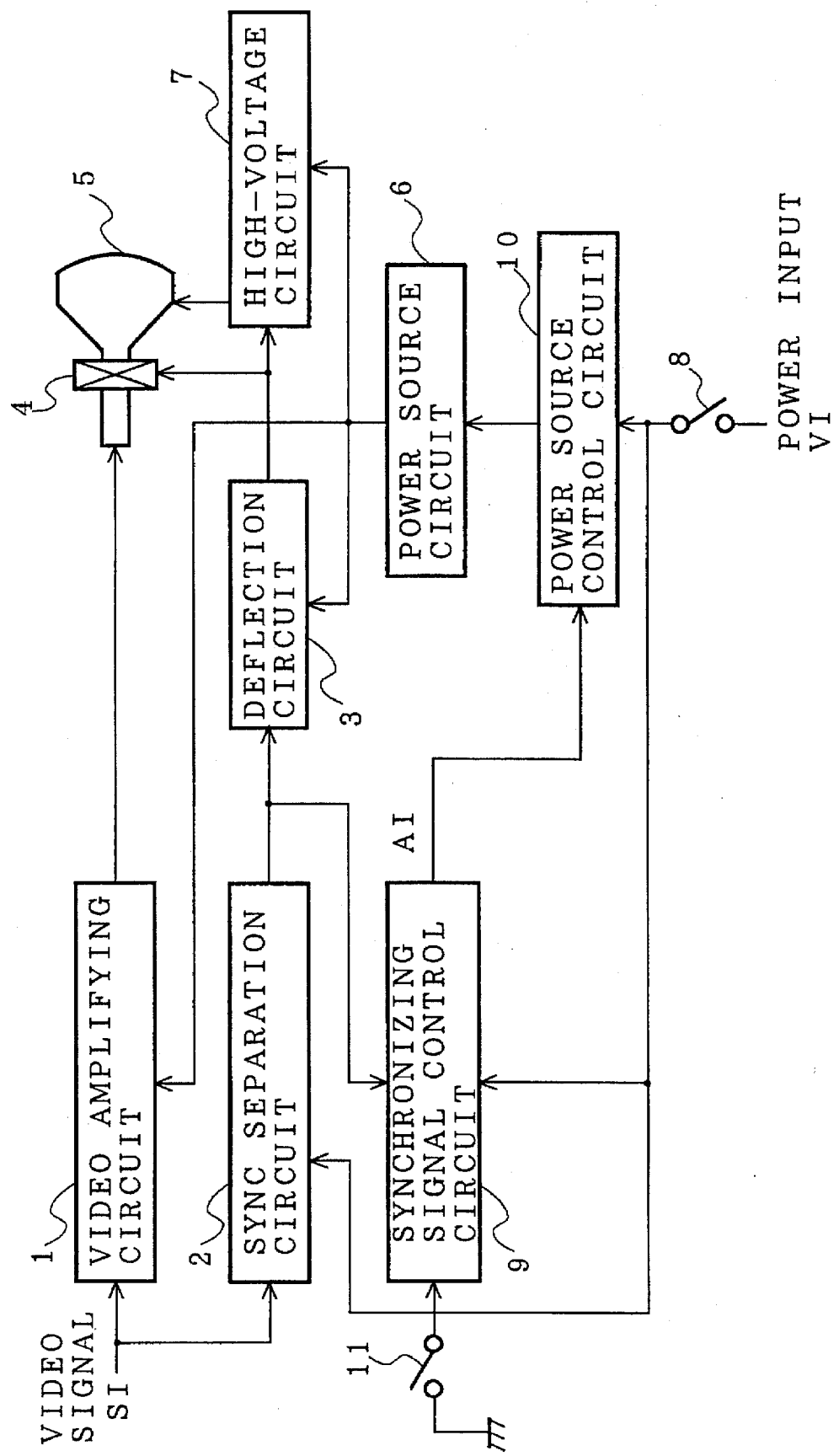
FIG. 1 is a circuit block diagram showing a first embodiment (Embodiment 1) of the present invention.

FIG. 1 is a circuit block diagram showing an embodiment 1 of the present invention. Reference numeral 1 indicates a video amplifying circuit for amplifying an input video signal SI and outputting the amplified video signal to a CRT 5. Reference numeral 2 indicates a sync separation circuit for separating a synchronizing signal from the video signal SI to take out it. Reference numeral 3 indicates a deflection circuit for allowing a sawtooth current synchronized with the synchronizing signal outputted from the sync separation circuit 2 to flow into a deflection coil 4 of the CRT 5. Reference numeral 7 indicates a high voltage circuit for receiving an output produced from the deflection circuit 3 therein and supplying a high voltage to the CRT 5. Reference numeral 6 indicates a power source circuit for supplying a power source voltage to the video amplifying circuit 1, the deflection circuit 3 and the high voltage circuit 7. Reference numeral 8 indicates a power switch for switching a power input VI. Reference numeral 9 indicates a synchronizing signal control circuit for detecting the synchronizing signal from the video signal SI and controlling a synchronizing signal detected by an external switch 11. Further, reference numeral 10 indicates a power source control circuit controlled by the synchronizing signal control circuit 9, for turning on and off the power source circuit 6.

Figure 2:
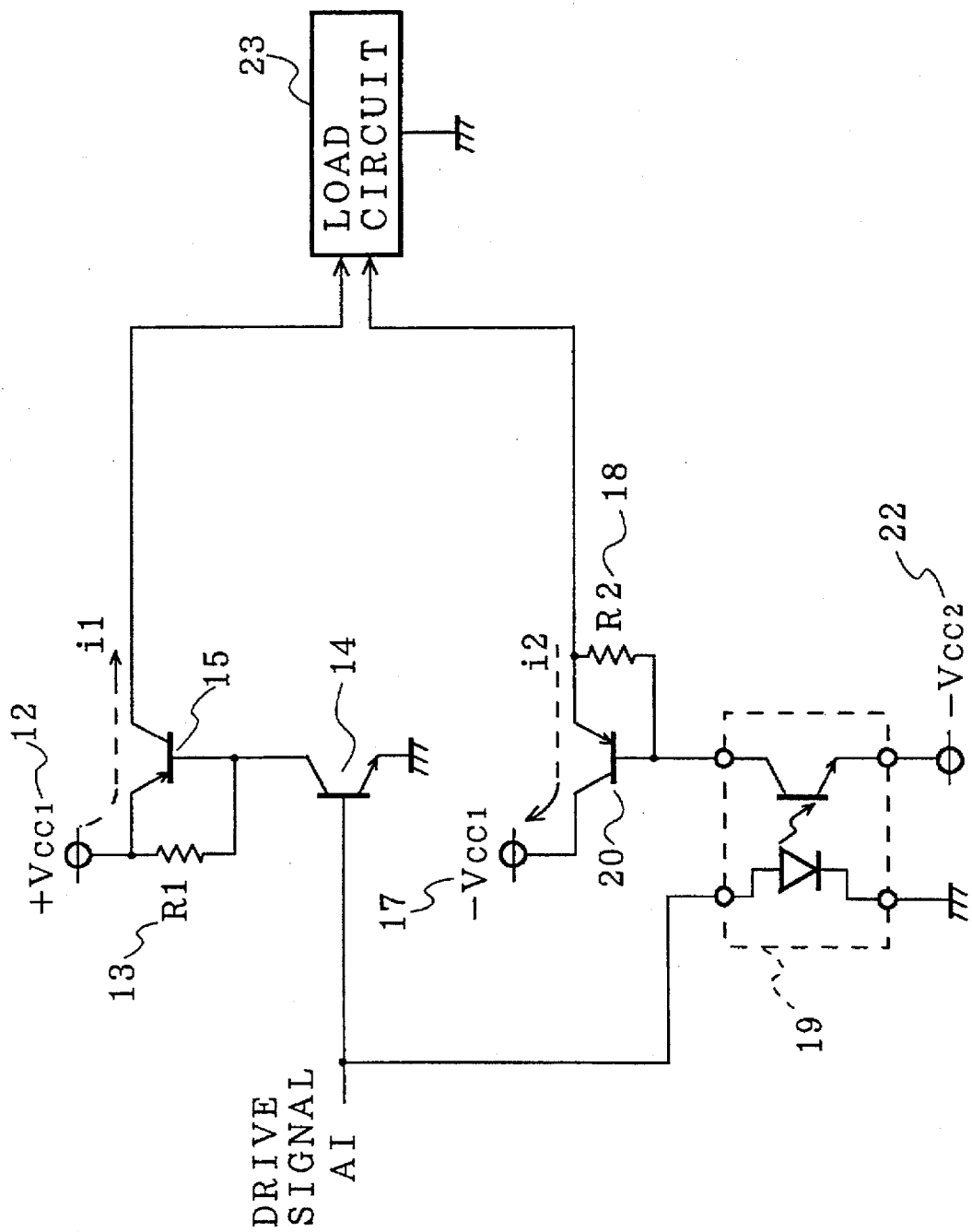
FIG. 2 is a circuit diagram illustrating a power source control circuit employed in the embodiment 1 shown in FIG. 1.

FIG. 2 is a circuit diagram showing one example of circuit configurations of the power source control circuit 10 and the power source circuit 6 both shown in FIG. 1. In FIG. 2, reference numeral 14 indicates a drive transistor supplied with a drive signal AI from the synchronizing signal control circuit 9. Reference numeral 15 indicates a positive power source control transistor controlled by the drive transistor 14, which control transistor 15 is constructed in such a manner that a positive power source 12 (voltage: +Vcc1) is electrically connected to the emitter thereof and that a resistor 13 (whose resistance value is R1) is inserted between the emitter and base thereof. Reference numeral 19 indicates a drive phototransistor to which the drive signal AI generated from the synchronizing signal control circuit 9 is applied. Reference numeral 20 indicates a negative power source control transistor controlled by the drive phototransistor 19 and whose collector is electrically connected to a negative power source 17 (voltage: −Vcc1). Reference numeral 18 indicates a resistor (whose resistance value is R2) electrically connected between the emitter and base of the transistor 20. Reference numeral 22 indicates a negative power source (voltage: −Vcc23) which supplies a voltage −Vcc2 satisfying the relationship of −Vcc1>−Vcc2. Reference numeral 23 indicates a load circuit which corresponds a power source section including the video amplifying circuit 1, the deflection circuit 3, the high voltage circuit 7, etc. The positive power source 12, the transistor 15, the resistor 13, the negative power source 17, the transistor 20 and the resistor 18 constitute the power source circuit 6, whereas the transistor 14, the phototransistor 19 and the negative power source 22 constitute the power source control circuit 10.

Figure 3:
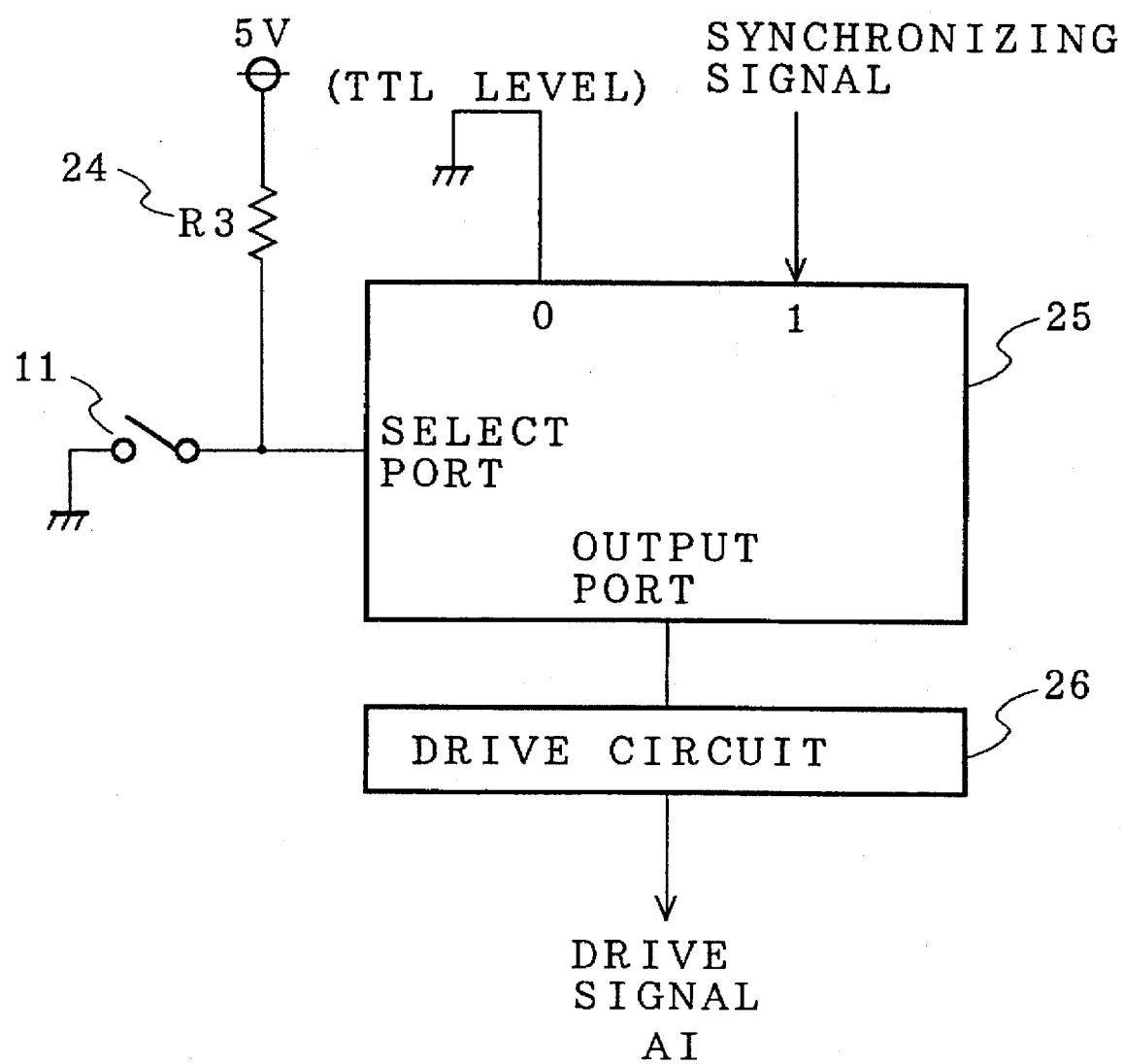
FIG. 3 is a circuit block diagram showing a synchronizing signal control circuit employed in the embodiment 1 shown in FIG. 1.
Figure 4:
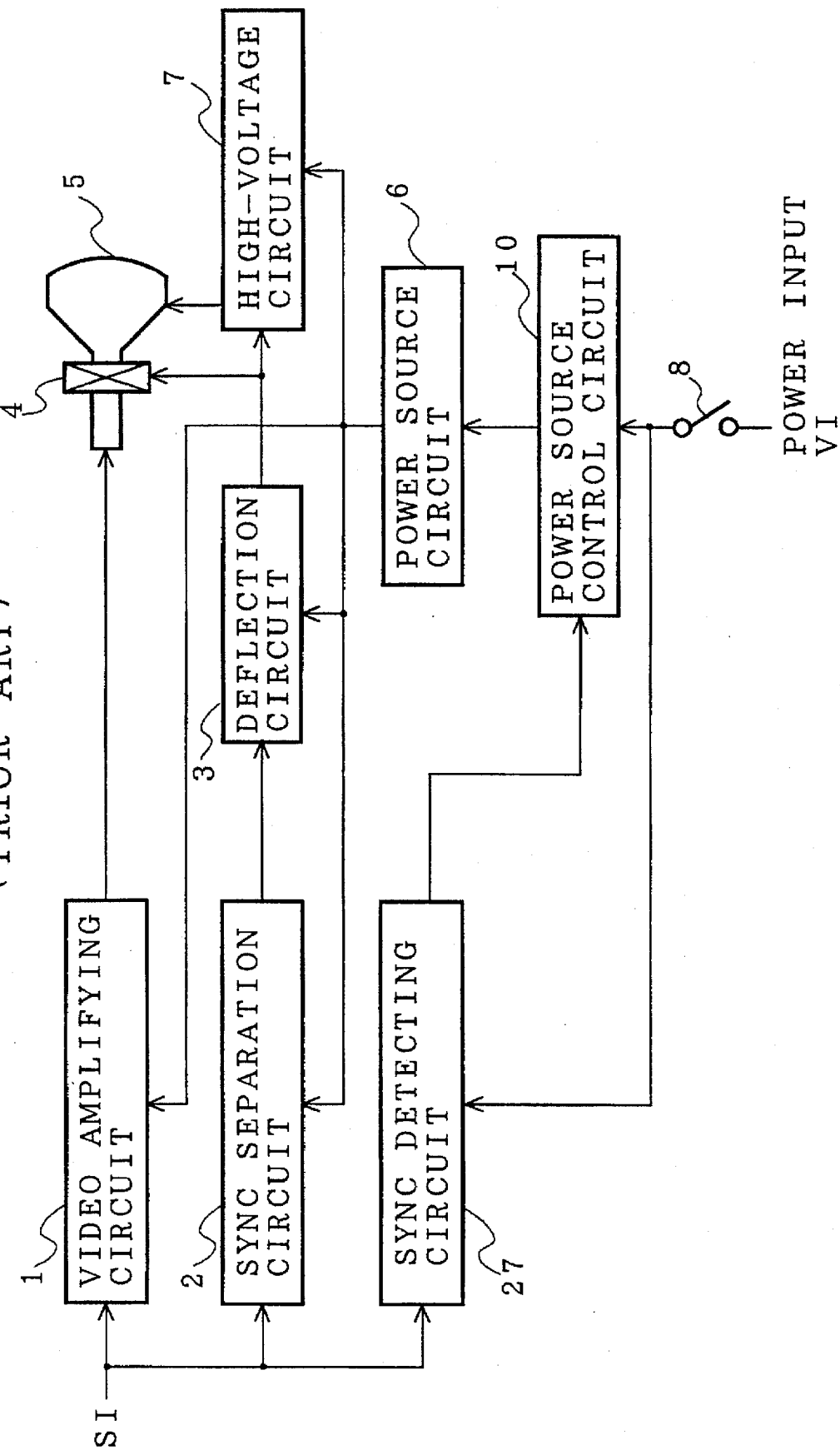
FIG. 4 is a circuit block diagram depicting a conventional display unit.

FIG. 3 is a circuit block diagram showing a detailed configuration of the synchronizing signal control circuit 9 shown in FIG. 1. In the same drawing, reference numeral 25 indicates a two-input selector for determining or judging whether the synchronizing signal exists. Reference numeral 6 indicates a drive circuit for supplying the drive signal AI indicative of the presence or absence of the synchronizing signal determined by the two-input selector to the power source control circuit 10. Reference numeral 11 indicates the external switch for controlling the synchronizing signal. Reference numeral 24 indicates a pull-up resistor for supplying a voltage having a high level (TTL level) to the external switch 11.

The operation of the present embodiment will now be described. If the synchronizing signal control circuit 9 judges the synchronizing signal to be "present" when the external switch 11 for control of the synchronizing signal is in an off state in FIG. 1, the power source control circuit 10 is activated in response to the drive signal AI corresponding to the synchronizing signal judged as being "present" so as to apply the power input VI to the power source circuit 6, thereby activating the video amplifying circuit 1, the deflection circuit 3 and the high voltage circuit 7, which are principal circuits. On the other hand, when the external switch 11 is in an on state, the synchronizing signal control circuit 9 judges the synchronizing signal to be "absent" regardless of the presence or absence of the synchronizing signal. Thus, the power source input VI is not supplied to the power source circuit 6 so that circuits other than the synchronizing signal control circuit 9 and the sync separation circuit 2 are deactivated. Namely, only when the external switch 11 is in the off state, it is judged that the synchronizing signal is "present." Thus, the power source control circuit 10 is activated to supply the power source input VI to the power source circuit 6, thereby activating all the circuits comprising the video amplifying circuit 1, the sync separation circuit 2, the deflection circuit 3, the power source circuit 6, the high voltage Circuit 7, the synchronizing signal control circuit 9 and the power source control circuit 10.

Upon the above operation, as shown in FIG. 2, when the drive signal AI for making a decision as to the presence or absence of the synchronizing signal is of a high signal (TTL level), i.e., it is judged that the synchronizing signal is "present", the drive transistor 14 and the drive 15 phototransistor 19 of the power source control circuit 10 are brought into conduction. Further, the transistor 15 whose emitter is electrically connected to the positive power source 12, and the transistor 20 whose collector is electrically connected to the negative power source 17, both transistors of which are used for the power source circuit 6, are brought into conduction. Next, a positive power current i1 and a negative power current i2 flow so that voltages obtained from the positive power source 12 and the negative power source 17 are detected by the resistors 13 and 18 respectively. Both the detected voltages are supplied to the load circuit 23.

On the other hand, when the drive signal AI for making the decision as to the presence or absence of the synchronizing signal is of a low signal (TTL level), i.e., it is judged that the synchronizing signal is "absent", the drive transistor 14 and the drive phototransistor 19 are both brought into non-conduction and the voltages from both the positive and negative power sources 12 and 17 are not detected. Therefore, no voltage is supplied to the load circuit 23. Namely, only when the drive signal AI for making the decision as to the presence or absence of the synchronizing signal is of the high signal (TTL level), i.e., it is judged that the synchronizing signal is "present," both power source voltages produced from the positive and negative power sources 12 and 17 are simultaneously supplied to the load circuit 23.

Referring further to FIG. 3, when the external switch 11 is in the off state, the two-input selector 25 selects the synchronizing signal through the pull-up resistor 24 and judges the synchronizing signal to be "present". As a result, the drive circuit 26 outputs the high signal (TTL level) from the output terminal thereof as the drive signal AI. On the other hand, when the external switch 11 is turned on, the two-input selector 25 does not select the synchronizing signal and judges that the synchronizing signal in the video signal SI is "absent". As a result, the drive circuit 26 outputs the low signal (TTL level) from the output terminal thereof as the drive signal AI. Namely, only when the external switch 11 is in the off state, the drive circuit 26 outputs the high signal (TTL level) from the output terminal thereof as the drive signal AI. Thus, the turning on and off of the synchronizing signal control switch 11 makes it possible to prevent the power source circuit from malfunctioning.

While the present invention has been described above with reference to the preferred embodiment, these description is made by way of illustration. It should be borne in mind that modifications and changes of the illustrative embodiment can be made without departing from the spirit or scope of the following claims.

What is claimed is:

1. A display unit comprising:
    a video amplifying circuit for amplifying a video signal and outputting an amplified video signal to a cathode-ray tube;
    a sync separation circuit for separating a synchronizing signal from the video signal to take out the video signal;
    a deflection circuit for allowing a sawtooth current synchronized with an output produced from the sync separation circuit to flow into a deflection coil of said cathode-ray tube;
    a high voltage circuit for receiving therein an output produced from said deflection circuit and supplying a high voltage to the cathode ray tube;
    a synchronizing signal control circuit for determining whether the synchronizing signal obtained from said sync separation circuit is present and outputting a signal indicative of the presence or absence of the synchronizing signal therefrom, said synchronizing signal control circuit having a synchronizing signal control switch for enabling supply of a signal indicative of the absence of the synchronizing signal at all times as necessary;
    a power source control circuit for opening and closing a power source circuit in response to an output supplied from said synchronizing signal control circuit; and a power switch connected to a terminal for inputting power to said display unit;

whereby said sync separation circuit, said synchronizing signal control circuit and said power source control circuit are directly supplied with power from a power source through said power switch and at least one of said video amplifying circuit, said deflection circuit and said high voltage circuit is at least partially supplied with power from said power source circuit.

2. A display unit according to claim 1, wherein said power source circuit comprises a positive power source for supplying a positive voltage to a load circuit, a negative power source for supplying a negative voltage, a first control device for controlling supply of power from the positive power source and a second control device for controlling supply of power from the negative power source, and said power source control circuit has control means for simultaneously controlling the first and second control devices in response to a drive signal outputted from said synchronizing signal control circuit.

3. A display unit according to claim 2, wherein a device for controlling the second control device of said control means is a phototransistor controlled on the drive signal outputted from said synchronizing signal control circuit.

4. A display unit according to claim 1, wherein said synchronizing signal control circuit comprises a two-input selector and a drive circuit for driving said power source control circuit, and a select port, one input, other input and an output of said two-input selector are respectively coupled to the synchronizing signal control switch, a constant voltage level, the synchronizing signal and the drive circuit.

\* \* \* \* \*